United States Patent
Ahmed

(10) Patent No.: US 12,453,962 B1
(45) Date of Patent: Oct. 28, 2025

(54) MULTIPHASE STRUCTURED NANOCOMPOSITE

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/072,855

(22) Filed: Mar. 6, 2025

(51) Int. Cl.
  *B01J 23/755* (2006.01)
  *B01J 20/04* (2006.01)
  (Continued)

(52) U.S. Cl.
  CPC ........... *B01J 23/755* (2013.01); *B01J 20/041* (2013.01); *B01J 20/06* (2013.01);
  (Continued)

(58) Field of Classification Search
  CPC .............................. B01J 20/041; B01J 23/755
  See application file for complete search history.

(56) References Cited

U.S. PATENT DOCUMENTS 4,793,797 A * 12/1988 Kato .................... B01D 53/864
 431/7
7,569,512 B2 * 8/2009 Weissman .............. B01J 21/066
 502/325
(Continued)

FOREIGN PATENT DOCUMENTS

CN    107164013 A    9/2017
CN    116065421 A    5/2023
(Continued)

OTHER PUBLICATIONS

Machine Translation of CN-116495762-A, 2025 (Year: 2025).*
(Continued)

*Primary Examiner* — Liam J Heincer
(74) *Attorney, Agent, or Firm* — Oblon, McClelland, Maier & Neustadt, L.L.P.

(57) ABSTRACT

A $NiO/MgO/CaCO_3/Ca(OH)_2/C$ nanocomposite material includes a monoclinic nickel oxide (NiO) phase, a cubic magnesium oxide (MgO) phase, a hexagonal calcium carbonate ($CaCO_3$) phase, and a hexagonal calcium hydroxide ($Ca(OH)_2$) phase. The $NiO/MgO/CaCO_3/Ca(OH)_2/C$ nanocomposite material has a granular morphology including spherical particles having an average particle diameter in a range from 10 nanometer (nm) to 50 nm. Further, a $CaO/NiO/Mg_{0.5}Ni_{0.5}O/Ca(OH)_2/C$ nanocomposite material includes cubic CaO phases, cubic NiO phases, cubic $Mg_{0.5}Ni_{0.5}O$ phases, and hexagonal $Ca(OH)_2$ phases. The $CaO/NiO/Mg_{0.5}Ni_{0.5}O/Ca(OH)_2/C$ nanocomposite material has a granular morphology including particles having an average particle diameter in a range from 10 nm to 90 nm.

4 Claims, 7 Drawing Sheets

(51) Int. Cl.
  *B01J 20/06* (2006.01)
  *B01J 20/28* (2006.01)
  *B01J 20/30* (2006.01)
  *B01J 21/18* (2006.01)
  *B01J 23/02* (2006.01)
  *B01J 23/78* (2006.01)
  *B01J 27/232* (2006.01)
  *B01J 35/30* (2024.01)
  *B01J 35/45* (2024.01)
  *B01J 35/51* (2024.01)
  *B01J 35/77* (2024.01)
  *B01J 37/00* (2006.01)
  *B01J 37/04* (2006.01)
  *B01J 37/08* (2006.01)
  *C02F 1/28* (2023.01)
  *C02F 101/20* (2006.01)
  *H01M 4/525* (2010.01)
  *H01M 4/90* (2006.01)

(52) U.S. Cl.
  CPC ... *B01J 20/28007* (2013.01); *B01J 20/28019* (2013.01); *B01J 20/3042* (2013.01); *B01J 20/3078* (2013.01); *B01J 21/18* (2013.01); *B01J 23/02* (2013.01); *B01J 23/78* (2013.01); *B01J 27/232* (2013.01); *B01J 35/394* (2024.01); *B01J 35/45* (2024.01); *B01J 35/51* (2024.01); *B01J 35/77* (2024.01); *B01J 37/0009* (2013.01); *B01J 37/04* (2013.01); *B01J 37/084* (2013.01); *B01J 37/088* (2013.01); *C02F 1/288* (2013.01); *C02F 1/281* (2013.01); *C02F 2101/20* (2013.01); *H01M 4/525* (2013.01); *H01M 4/9016* (2013.01)

(56) References Cited

U.S. PATENT DOCUMENTS

| | | | |
|---|---|---|---|
| 8,397,812 B2 * | 3/2013 | Huang | C09K 8/68 166/278 |
| 12,281,048 B1 * | 4/2025 | Ahmed | C04B 35/64 |
| 2003/0097034 A1 * | 5/2003 | Liu | C07C 5/3332 585/654 |
| 2004/0238410 A1 * | 12/2004 | Inoue | C01G 25/02 208/213 |
| 2010/0155310 A1 * | 6/2010 | Enomura | B22F 9/24 977/840 |
| 2013/0247363 A1 * | 9/2013 | Nelson | H01M 4/26 252/182.1 |
| 2013/0252085 A1 * | 9/2013 | Nelson | C01G 53/50 429/223 |

FOREIGN PATENT DOCUMENTS

| | | | | |
|---|---|---|---|---|
| CN | 116495762 A | * | 7/2023 | C01F 11/18 |
| KR | 10-2011-0089835 A | | 8/2011 | |
| TW | 201029245 A1 | | 8/2010 | |

OTHER PUBLICATIONS

Akash et al. (Bulgarian Chemical Communications, vol. 55, Special Issue A, 2023, p. 5-11) (Year: 2023).*

Manviri Rani, et al., "Biowaste-derived nanocomposite of calcium oxide incorporated in nickel oxide for efficient removal of organic pollutants", Biomass Conversion and Biorefinery, Feb. 29, 2024, 22 pages.

Abdelrahman M. Rabie et al., "Diatomite supported by CaO/MgO nanocomposite as heterogeneous catalyst for biodiesel production from waste cooking oil", Journal of Molecular Liquids, vol. 279, Jan. 23, 2019, pp. 224-231, 7 pages.

* cited by examiner

MULTIPHASE STRUCTURED NANOCOMPOSITE

BACKGROUND

Technical Field

The present disclosure is directed towards nanocomposite material, and more particularly, relates to synthesis of a multiphase nanocomposite material using Pechini sol-gel method.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Multifunctional nanocomposites are of utmost importance in industrial and environmental applications due to desirable physicochemical properties. The nanocomposites exhibit high thermal stability, tunable electronic characteristics, enhanced mechanical strength, and controlled porosity, making nanocomposites suitable for catalysis, water treatment, and energy storage. Further, the integration of multiple functional phases into a single nanocomposite structure allows for synergistic effects that improve overall performance. Properties such as high surface area, enhanced adsorption capacity, and ion-exchange capabilities contribute to the growing significance of nanocomposites in material science.

Presently, research has focused on metal oxide-based nanostructures, carbonate-based nanostructures, and hydroxide-based nanostructures, leading to the development of nickel oxide, magnesium oxide, and calcium hydroxide nanomaterials. The above listed materials have demonstrated applications in catalytic reactions, pollutant removal, and electrochemical processes. Synthesis techniques, including sol-gel, co-precipitation, and hydrothermal methods, have been employed to fabricate nanostructures with controlled phase composition and particle morphology. In particular, the Pechini sol-gel method has improved phase homogeneity and crystallite size control in metal oxide materials.

Despite advancements, existing technologies exhibit certain drawbacks. A plurality of nanocomposites suffer from inconsistent particle size distribution, poor morphological control, and limited compositional uniformity. Single-phase and binary nanomaterials lack multifunctionality required for high-performance applications. High production costs, complex synthesis procedures, and energy-intensive processing hinder the scalability of nanocomposites. While the Pechini sol-gel method has improved aspects of metal oxide synthesis, application to multi-phase nanocomposites remains underexplored, leaving a gap in the development of integrated systems that combine calcium carbonate, nickel-magnesium oxides, and other functional phases. Furthermore, phase instability, inefficient synthesis, and functional limitations of existing multi-phase nanocomposites hinder their adoption in catalysis, environmental remediation, and energy-related technologies.

Accordingly, one object of the present disclosure is to provide a multiphase nanocomposite material and a method of preparation thereof, that may circumvent the above listed drawbacks and limitations of existing materials and methods known in the art.

SUMMARY

In an exemplary embodiment, a $NiO/MgO/CaCO_3/Ca(OH)_2/C$ nanocomposite material is described. The nanocomposite material includes a monoclinic nickel oxide (NiO) phase, a cubic magnesium oxide (MgO) phase, a hexagonal calcium carbonate ($CaCO_3$) phase, and a hexagonal calcium hydroxide ($Ca(OH)_2$) phase. The $NiO/MgO/CaCO_3/Ca(OH)_2/C$ nanocomposite material has a granular morphology including spherical particles having an average particle diameter in a range from 10 nanometer (nm) to 50 nm.

In some embodiments, the spherical particles have an average particle diameter in a range from 20 nm to 30 nm.

In some embodiments, the $NiO/MgO/CaCO_3/Ca(OH)_2/C$ nanocomposite material has an oxygen content in a range from 40 atomic % (at. %) to 60 at. %, a calcium (Ca) content in a range from 5 at. % to 25 at. %, a nickel (Ni) content in a range from 8 at. % to 18 at. %, a magnesium (Mg) content in a range from 8 at. % to 18 at. %, and a carbon (C) content in a range from 5 at. % to 20 at. % wherein at. % is based on the total number of atoms in the $NiO/MgO/CaCO_3/Ca(OH)_2/C$ nanocomposite material.

In some embodiments, the $NiO/MgO/CaCO_3/Ca(OH)_2/C$ nanocomposite material has an oxygen content in a range from 45 at. % to 55 at. %, a calcium content in a range from 10 at. % to 20 at. %, a nickel content in a range from 10 at. % to 16 at. %, a magnesium content in a range from 10 at. % to 15 at. %, and a carbon content in a range from 6 at. % to 15 at. % wherein at. % is based on the total number of atoms in the $NiO/MgO/CaCO_3/Ca(OH)_2/C$ nanocomposite material.

In some embodiments, the $NiO/MgO/CaCO_3/Ca(OH)_2/C$ nanocomposite material has an average crystallite size in a range from 40 nm to 80 nm.

In another exemplary embodiment, a $CaO/NiO/Mg_{0.5}Ni_{0.5}O/Ca(OH)_2/C$ nanocomposite material is described. The nanocomposite material includes cubic CaO phases, cubic NiO phases, cubic $Mg_{0.5}Ni_{0.5}O$ phases, and hexagonal $Ca(OH)_2$ phases. The $CaO/NiO/Mg_{0.5}Ni_{0.5}O/Ca(OH)_2/C$ nanocomposite material has a granular morphology including particles having an average particle diameter in a range from 10 nm to 90 nm.

In some embodiments, the particles have an average particle diameter in a range from 20 nm to 60 nm.

In some embodiments, the $CaO/NiO/Mg_{0.5}Ni_{0.5}O/Ca(OH)_2/C$ nanocomposite material has an oxygen content in a range from 45 at. % to 70 at. %, a calcium content in a range from 5 at. % to 25 at. %, a nickel content in a range from 5 at. % to 15 at. %, a magnesium content in a range from 5 at. % to 17 at. %, and a carbon content in a range from 3 at. % to 20 at. % where at. % is based on the total number of atoms in the $NiO/MgO/CaCO_3/Ca(OH)_2/C$ nanocomposite material.

In some embodiments, the $CaO/NiO/Mg_{0.5}Ni_{0.5}O/Ca(OH)_2/C$ nanocomposite material has an oxygen content in a range from 50 at. % to 60 at. %, a calcium content in a range from 10 at. % to 20 at. %, a nickel content in a range from 7 at. % to 13 at. %, a magnesium content in a range from 8 at. % to 15 at. %, and a carbon content in a range from 5 at. % to 12 at. % wherein at. % is based on the total number of atoms in the $NiO/MgO/CaCO_3/Ca(OH)_2/C$ nanocomposite material.

In some embodiments, the NiO/MgO/CaCO$_3$/Ca(OH)$_2$/C nanocomposite material has an average crystallite size in a range from 40 nm to 80 nm.

In one or more embodiments, the NiO/MgO/CaCO$_3$/Ca(OH)$_2$/C nanocomposite material has 2 to 50 wt. %, preferably 30 to 40 wt. % NiO, 20 to 40 wt. %, preferably 25 to 35 wt. % MgO, 15 to 35 wt. %, preferably 20 to 30 wt. % CaCO$_3$, 1 to 15 wt. %, preferably 4 to 9 wt. % Ca(OH)$_2$, and 1 to 20 wt. %, preferably 1 to 5 wt. % C, based on the total weight of the NiO/MgO/CaCO$_3$/Ca(OH)$_2$/C nanocomposite material.

In yet another exemplary embodiment, a method for making a nanocomposite material is described. The method includes adding a tartaric acid solution to a solution including Mg(NO$_3$)$_2$·6H$_2$O, Ca(NO$_3$)$_2$·4H$_2$O, and Ni(NO$_3$)$_2$·6H$_2$O under stirring to form a reaction mixture. Further, the method includes adding polyethylene glycol 400 to the reaction mixture and stirring at 250° C. until a solid is formed and calcining the solid at a temperature in a range from 550° C. to 850° C. for 1 hours to 5 hours to form the nanocomposite material.

In some embodiments, the concentration of tartaric acid in the reaction mixture is in a range from 100 grams per liter (g/L) to 130 g/L.

In some embodiments, the concentration of Mg(NO$_3$)$_2$·6H$_2$O in the reaction mixture is in a range from 60 g/L to 75 g/L.

In some embodiments, the concentration of Ca(NO$_3$)$_2$·4H$_2$O in the reaction mixture is in a range from 60 g/L to 75 g/L.

In some embodiments, the concentration of Ni(NO$_3$)$_2$·6H$_2$O in the reaction mixture is in a range from 60 g/L to 75 g/L.

In some embodiments, the concentration of polyethylene glycol 400 in the stabilized mixture is in a range from 35 ml per liter (ml/L) to 60 ml/L of stabilized solution.

In some embodiments, the solid is calcined at a temperature in a range from 550° C. to 650° C.

In some embodiments, the solid is calcined at a temperature in a range from 750° C. to 850° C.

In some embodiments, the solid is calcined for 2 hours to 4 hours.

In some embodiments, the solid is calcined for 3 hours.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
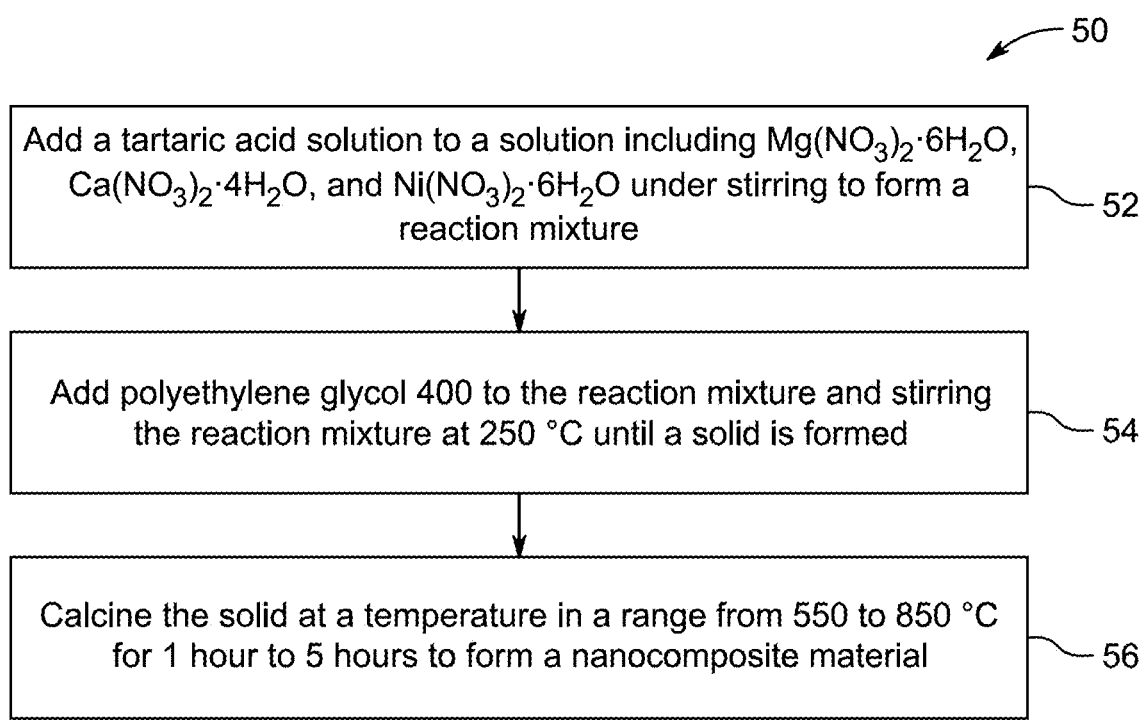
FIG. 1A illustrates an exemplary flow chart depicting a method for making a NiO/MgO/CaCO$_3$/Ca(OH)$_2$/C and CaO/NiO/Mg$_{0.5}$Ni$_{0.5}$O/Ca(OH)$_2$/C nanocomposite, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of 25 degrees Celsius (° C.)±3° C. in the present disclosure.

As used herein, the term 'nanoparticles (NPs)' refers to particles having a particle size of 1 nanometer (nm) to 500 nm within the scope of the present disclosure.

As used herein, the term 'nanocomposite' refers to a composite material that has at least one component with a grain size measured in nanometers.

As used herein, the term 'nanohybrid composite' refers to a material that combines nanomaterials (such as nanoparticles, nanotubes, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits unique properties that are enhanced to the individual materials alone.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is an parameter in characterizing the porous structure of materials, such as adsorbents or catalysts.

As used herein, the term 'average particle size' refers to the mean diameter of nanoparticles in a sample, typically calculated from measurements obtained using techniques such as scanning electron microscopy (SEM) or transmission electron microscopy (TEM), representing the typical size of the particles in the distribution.

As used herein, the term 'average crystallite size' refers to the mean size of crystalline regions in a material, typically determined through X-ray diffraction (XRD) analysis, and represents the size of the individual crystal domains within the sample, excluding any amorphous material.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

An aspect of the present disclosure is directed to a $NiO/MgO/CaCO_3/Ca(OH)_2/C$ and $CaO/NiO/Mg_{0.5}Ni_{0.5}O/Ca(OH)_2/C$ nanocomposite (also referred to as a nanocomposite material) fabricated using the Pechini sol-gel method. The nanocomposite of the present disclosure includes a multi-phase composition with controlled structural, morphological, and compositional properties for industrial and environmental applications.

According to a first aspect of the present disclosure, a $NiO/MgO/CaCO_3/Ca(OH)_2/C$ nanocomposite material is described. The nanocomposite material includes a monoclinic NiO phase, a cubic MgO phase, a hexagonal $CaCO_3$ phase, and a hexagonal $Ca(OH)_2$ phase. In some embodiments, the nanocomposite material may include crystalline phases, but is not limited to quartz, calcite, hematite, magnetite, goethite, dolomite, albite, anorthite, pyrite, fluorite, halite, barite, apatite, rutile, and zircon. In some embodiments, the nanocomposite material has an average crystallite size in the range from 20 to 100 nm, preferably 40 to 80 nm, preferably 50 to 70 nm, preferably 55 to 65 nm, preferably 55 to 60 nm. In a preferred embodiment, the nanocomposite material has an average crystallite size of 60.37 nm.

In some embodiments, the nanocomposite material is porous. Pores may be micropores, mesopores, macropores, and/or a combination thereof. The pores exist in the bulk material, not necessarily in the molecular structure of the material. The term 'microporous' means that nanocomposite material has pores with an average pore width (i.e. diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

In some embodiments, in the nanocomposite material comprises sheet morphologies, preferably nanosheets, although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nanourchins, nanoflowers, nanostars, tetrapods, and their mixtures thereof are also possible. In a preferred embodiment, nanocomposite material has a granular morphology including spherical particles. In some embodiments, the spherical particles have an average particle diameter ranging from 5 to 75 nm, preferably 10 to 50 nm, preferably 20 to 50 nm, preferably 30 to 50 nm, preferably 20 to 30 nm. In a preferred embodiment, the spherical particles have an average particle diameter of 25.89 nm.

In some embodiments, the nanocomposite material has an oxygen content in the range from 30 to 70 atomic % (at. %), preferably 40 to 60 atomic % (at. %), preferably 45 to 65 atomic % (at. %), preferably 50 to 60 atomic % (at. %), preferably 55 to 60 atomic % (at %) based on the total number of atoms in the nanocomposite material. In a preferred embodiment, the nanocomposite material has an oxygen content of 48.8% based on the total number of atoms in the nanocomposite material.

In some embodiments, the nanocomposite material has a calcium content in the range from 2.5 to 30 at. %, preferably 5 to 25 at. %, preferably 10 to 25 atomic % (at. %), preferably 15 to 25 atomic % (at. %), preferably 10 to 20 at. %, based on the total number of atoms in the nanocomposite material. In a preferred embodiment, the nanocomposite material has a calcium content of 15.6% based on the total number of atoms in the nanocomposite material.

In some embodiments, the nanocomposite material has a nickel content in the range from 5 to 30 at. %, preferably 8 to 18 at. %, preferably 10 to 18 atomic % (at. %), preferably 15 to 18 atomic % (at. %), preferably 10 to 16 at. %, based on the total number of atoms in the nanocomposite material. In a preferred embodiment, the nanocomposite material has a nickel content of 13.4% based on the total number of atoms in the nanocomposite material.

In some embodiments, the nanocomposite material has a magnesium content in the range from 2.5 to 30 at. %, preferably 8 to 18 at. %, preferably 10 to 18 atomic % (at. %), preferably 15 to 18 atomic % (at. %), preferably 10 to 15 at. %, based on the total number of atoms in the nanocomposite material. In a preferred embodiment, the nanocomposite material has a magnesium content of 13.1% based on the total number of atoms in the nanocomposite material.

In some embodiments, the nanocomposite material has a carbon content in the range of 2.5 to 30 at. %, preferably 5 to 20 at. %, preferably 10 to 20 atomic % (at. %), preferably 15 to 20 atomic % (at. %), preferably 5 to 15 at. %, based on the total number of atoms in the nanocomposite material. In a preferred embodiment, the nanocomposite has a carbon content of 9.1% based on the total number of atoms in the nanocomposite material.

In one or more embodiments, the $NiO/MgO/CaCO_3/Ca(OH)_2/C$ nanocomposite material has 24 to 44 wt. %, preferably 30 to 38 wt. % NiO, 15 to 40 wt. %, preferably 25 to 35 wt. % MgO, 15 to 40 wt. %, preferably 23 to 33 wt. % $CaCO_3$, 3 to 15 wt. %, preferably 4 to 10 wt. % $Ca(OH)_2$, and 1 to 20 wt. %, preferably 1 to 10 wt. % C, based on the total weight of the $NiO/MgO/CaCO_3/Ca(OH)_2/C$ nanocomposite material.

According to a second aspect of the present disclosure, a $CaO/NiO/Mg_{0.5}Ni_{0.5}O/Ca(OH)_2/C$ nanocomposite material is described. The $CaO/NiO/Mg_{0.5}Ni_{0.5}O/Ca(OH)_2/C$ nanocomposite material includes a cubic CaO phase, cubic NiO phases, cubic $Mg_{0.5}Ni_{0.5}O$ phases, and hexagonal $Ca(OH)_2$ phases. In some embodiments, the $CaO/NiO/Mg_{0.5}Ni_{0.5}O/Ca(OH)_2/C$ nanocomposite material may include crystalline phases, but is not limited to quartz, calcite, hematite, magnetite, goethite, dolomite, albite, anorthite, pyrite, fluorite, halite, barite, apatite, rutile, and zircon. In some embodiments, the $CaO/NiO/Mg_{0.5}Ni_{0.5}O/Ca(OH)_2/C$ nanocomposite material has an average crystallite size in the range from 20 to 100 nm, preferably 40 to 80 nm, preferably 50 to 70 nm, preferably 55 to 65 nm, preferably 55 to 60 nm. In a preferred embodiment, the $CaO/NiO/Mg_{0.5}Ni_{0.5}O/Ca(OH)_2/C$ nanocomposite material has an average crystallite size of 52.65 nm.

In some embodiments, in the $CaO/NiO/Mg_{0.5}Ni_{0.5}O/Ca(OH)_2/C$ nanocomposite material comprises sheet morphologies, preferably nanosheets, although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof are also possible. In a preferred embodiment, the $CaO/NiO/Mg_{0.5}Ni_{0.5}O/Ca(OH)_2/C$ nanocomposite material has a granular morphology, including irregular particles. In some embodiments, the irregular particles of nanoparticles may have an average particle diameter ranging from 5 to 100 nm, preferably 10 to 90 nm, preferably 30 to 90 nm, preferably 60 to 90 nm, preferably 20 to 60 nm. In a preferred embodiment, the irregular particles of nanoparticles have an average particle diameter of 35.47 nm.

In some embodiments, the $CaO/NiO/Mg_{0.5}Ni_{0.5}O/Ca(OH)_2/C$ nanocomposite material has an oxygen content in the range from 35 to 80 at. %, preferably 45 to 70 atomic % (at. %), preferably 45 to 70 atomic % (at. %), preferably 50 to 70 atomic % (at. %), preferably 50 to 60 atomic % (at. %) based on the total number of atoms in the $CaO/NiO/Mg_{0.5}Ni_{0.5}O/Ca(OH)_2/C$ nanocomposite material. In a preferred embodiment, the $CaO/NiO/Mg_{0.5}Ni_{0.5}O/Ca(OH)_2/C$ nanocomposite material has an oxygen content of 54.7% based on the total number of atoms in the $CaO/NiO/Mg_{0.5}Ni_{0.5}O/Ca(OH)_2/C$ nanocomposite material.

In some embodiments, the $CaO/NiO/Mg_{0.5}Ni_{0.5}O/Ca(OH)_2/C$ nanocomposite material has a calcium content in the range from 2.5 to 30 at. %, preferably, 5 to 25 at. %, preferably 10 to 25 at. %, preferably 15 to 25 atomic % (at. %), preferably 10 to 20 at. %, based on the total number of atoms in the $CaO/NiO/Mg_{0.5}Ni_{0.5}O/Ca(OH)_2/C$ nanocomposite material. In a preferred embodiment, the $CaO/NiO/Mg_{0.5}Ni_{0.5}O/Ca(OH)_2/C$ nanocomposite material has a calcium content of 14.1% based on the total number of atoms in the $CaO/NiO/Mg_{0.5}Ni_{0.5}O/Ca(OH)_2/C$ nanocomposite material.

In some embodiments, the $CaO/NiO/Mg_{0.5}Ni_{0.5}O/Ca(OH)_2/C$ nanocomposite material has a nickel content in the range from 2.5 to 20 at. %, preferably 5 to 15 at. %, preferably 7 to 15 atomic % (at. %), preferably 10 to 15 atomic % (at. %), preferably 7 to 10 at. %, based on the total number of atoms in the $CaO/NiO/Mg_{0.5}Ni_{0.5}O/Ca(OH)_2/C$ nanocomposite material. In a preferred embodiment, the $CaO/NiO/Mg_{0.5}Ni_{0.5}O/Ca(OH)_2/C$ nanocomposite material has a nickel content of 10.4% based on the total number of atoms in the $CaO/NiO/Mg_{0.5}Ni_{0.5}O/Ca(OH)_2/C$ nanocomposite material.

In some embodiments, the $CaO/NiO/Mg_{0.5}Ni_{0.5}O/Ca(OH)_2/C$ nanocomposite material has a magnesium content in the range from 2.5 to 25 at. %, preferably 5 to 17 at. %, preferably 7 to 17 atomic % (at. %), preferably 10 to 17 atomic % (at. %), preferably 8 to 15 at. %, based on the total number of atoms in the $CaO/NiO/Mg_{0.5}Ni_{0.5}O/Ca(OH)_2/C$ nanocomposite material. In a preferred embodiment, the $CaO/NiO/Mg_{0.5}Ni_{0.5}O/Ca(OH)_2/C$ nanocomposite material has a magnesium content of 12.1% based on the total number of atoms in the $CaO/NiO/Mg_{0.5}Ni_{0.5}O/Ca(OH)_2/C$ nanocomposite material.

In some embodiments, the $CaO/NiO/Mg_{0.5}Ni_{0.5}O/Ca(OH)_2/C$ nanocomposite material has an carbon content in the range from 1.5 to 30 at. %, preferably 3 to 20 at. %, preferably 10 to 20 atomic % (at. %), preferably 15 to 20 atomic % (at. %), preferably 5 to 12 at. %, based on the total number of atoms in the $CaO/NiO/Mg_{0.5}Ni_{0.5}O/Ca(OH)_2/C$ nanocomposite material. In a preferred embodiment, the nanocomposite has a carbon content of 8.7% based on the total number of atoms in the $CaO/NiO/Mg_{0.5}Ni_{0.5}O/Ca(OH)_2/C$ nanocomposite material.

In one or more embodiments, the $CaO/NiO/Mg_{0.5}Ni_{0.5}O/Ca(OH)_2/C$ nanocomposite material has 10 to 32 wt. %, preferably 17 to 27 wt. % CaO, 15 to 40 wt. %, preferably 20 to 35 wt. % NiO, 20 to 45 wt. %, preferably 30 to 42 wt. % $Mg_{0.5}Ni_{0.5}O$, 1 to 15 wt. %, preferably 2 to 8 wt. % $Ca(OH)_2$, and 1 to 20 wt. %, preferably 1 to 15 wt. % C, based on the total weight of the $CaO/NiO/Mg_{0.5}Ni_{0.5}O/Ca(OH)_2/C$ nanocomposite material.

FIG. 1A illustrates a schematic flow chart of a method 50 of preparing the nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes adding a tartaric acid solution to a solution comprising $Mg(NO_3)_2 \cdot 6H_2O$, $Ca(NO_3)_2 \cdot 4H_2O$, and $Ni(NO_3)_2 \cdot 6H_2O$ under stirring to form a reaction mixture. In some embodiments, other magnesium salts, apart from $Mg(NO_3)_2 \cdot 6H_2O$, may also be used, for example, magnesium chloride, magnesium sulfate, magnesium acetate, magnesium carbonate, magnesium citrate, magnesium phosphate, magnesium fluoride, magnesium bromide, magnesium iodide, magnesium oxalate, magnesium tartrate, magnesium formate, magnesium silicate, magnesium arsenate, magnesium molybdate, magnesium tungstate, magnesium chromate, magnesium permanganate, magnesium borate, magnesium selenate, magnesium tellurate, magnesium vanadate, magnesium ferrate, magnesium stannate, magnesium zirconate, magnesium hydroxide, magnesium thiocyanate, magnesium hypochlorite, and magnesium thiophosphate. In some embodiments, the concentration of $Mg(NO_3)_2 \cdot 6H_2O$ in the reaction mixture may range from 50 to 100 g/L, preferably 60 to 75 g/L, preferably 62 to 75 g/L, preferably 65 to 75 g/L, preferably 70 to 75 g/L, preferably 72 to 75 g/L. In a preferred embodiment, the concentration of $Mg(NO_3)_2 \cdot 6H_2O$ in the reaction mixture is 100 g/L.

In some embodiments, other calcium salts, apart from $Ca(NO_3)_2 \cdot 4H_2O$, may also be used, for example, the calcium salt may include but is not limited to calcium chloride, calcium sulfate, calcium carbonate, calcium acetate, calcium citrate, calcium phosphate, calcium lactate, calcium oxalate, calcium tartrate, calcium formate, calcium silicate, calcium fluoride, calcium bromide, calcium iodide, calcium arsenate, calcium molybdate, calcium tungstate, calcium chromate, calcium permanganate, calcium borate, calcium selenate, calcium tellurate, calcium vanadate, calcium ferrate, calcium stannate, calcium zirconate, calcium hydroxide, calcium hypochlorite, calcium thiocyanate, and calcium thiophosphate. In some embodiments, the concentration of $Ca(NO_3)_2 \cdot 4H_2O$ in the reaction mixture may range from 50 to 100 g/L, preferably 60 to 75 g/L, preferably 62 to 75 g/L, preferably 65 to 75 g/L, preferably 70 to 75 g/L, preferably 72 to 75 g/L In a preferred embodiment, the concentration of $Ca(NO_3)_2 \cdot 4H_2O$ in the reaction mixture is 100 g/L.

In some embodiments, other nickel salts, apart from $Ni(NO_3)_2 \cdot 6H_2O$, may also be used, for example, nickel chloride, nickel sulfate, nickel acetate, nickel carbonate, nickel citrate, nickel phosphate, nickel fluoride, nickel bromide, nickel iodide, nickel oxalate, nickel tartrate, nickel formate, nickel silicate, nickel arsenate, nickel molybdate, nickel tungstate, nickel chromate, nickel permanganate, nickel borate, nickel selenate, nickel tellurate, nickel vanadate, nickel ferrate, nickel stannate, nickel zirconate, nickel hydroxide, nickel thiocyanate, nickel hypochlorite, nickel thiophosphate, and nickel cyanide. In some embodiments, the concentration of $Ni(NO_3)_2 \cdot 6H_2O$. in the reaction mixture may range from 50 to 100 g/L, preferably 60 to 75 g/L, preferably 62 to 75 g/L, preferably 65 to 75 g/L, preferably 70 to 75 g/L, preferably 72 to 75 g/L. In a preferred embodiment, the concentration of $Ni(NO_3)_2 \cdot 6H_2O$. in the reaction mixture is 100 g/L.

Tartaric acid is added as a chelating agent. In some embodiments, other chelating agents, such as, citric acid, malic acid, mandelic acid and 12-hydroxystearic acid, may also be used. In some embodiments, the chelating agent is selected from a group consisting of one or more of isosteric acid, isocitric acid, aconitic acid, tricarboxylic acid, carboxylic acid, dicarboxylic acid, tricarboxylic acid, aminopolycarboxylic acid and polycarboxylic acid. In some embodiments, the carboxylic acid includes saturated dicarboxylic acids and unsaturated dicarboxylic acids. In some embodiments, the saturated dicarboxylic acids include adipic acid, and succinic acid. The unsaturated dicarboxylic acids include fumaric acid, glutaconic acid, muconic acid, and citraconic acid. In some embodiments, the chelating agent is one or more of disodium edetate, trisodium edetate, sodium citrate, sodium tartrate, lactic acid, sodium polyphosphate, sodium metaphosphate or gluconic acid, and salicylic acid.

In some alternate embodiments, the chelating agent consists of tartaric acid. Tartaric acid includes natural and commercial forms of the acid. In some embodiments, tartaric acid is D-tartaric acid, L-tartaric acid, achiral tartaric acid or racemic mixture of D- and L-tartaric acid forms.

In some embodiments, the concentration of tartaric acid in the reaction mixture may range from 50 to 200 g/L, preferably 100 to 130 g/L, preferably 105 to 130 g/L, preferably 110 to 130 g/L, preferably 115 to 130 g/L, preferably 120 to 130 g/L, preferably 125 to 130 g/L. In a preferred embodiment, the concentration of tartaric acid in the reaction mixture is 350 g/L.

At step 54, the method 50 includes adding polyethylene glycol 400 to the reaction mixture to form a stabilized mixture and stirring at 250° C. until a solid is formed. In some embodiments, the polyethylene glycol 400 is added in a dropwise manner into the reaction mixture. In some embodiments, the concentration of polyethylene glycol 400 in the stabilized mixture may range from 25 to 75 ml/L, preferably 35 to 60 ml per liter of stabilized solution, preferably 40 to 60 ml/L, preferably 45 to 60 ml/L, preferably 50 to 60 ml/L, preferably 55 to 60 ml/L. In a preferred embodiment, the concentration of polyethylene glycol 400 in the stabilized mixture is 48 ml/L.

At step 56, the method 50 includes calcining the solid at a temperature in the range from 550 to 850° C. for 1 to 5 hours to form the nanocomposite material. In some embodiments, the solid is calcined at a temperature in the range from 550 to 650° C., preferably 570 to 650° C., preferably 600 to 650° C., preferably 625 to 650° C. In one embodiment, the solid is calcined at 600° C. to form $NiO/MgO/CaCO_3/Ca(OH)_2/C$ nanocomposite material. In some embodiments, the solid is calcined at a temperature in the range from 750 to 850° C., preferably 770 to 850° C., preferably 800 to 850° C., preferably 825 to 850° C. In one embodiment, the solid is calcined at 800° C. to form $CaO/NiO/Mg_{0.5}Ni_{0.5}O/Ca(OH)_2/C$ nanocomposite material.

In some embodiments, the solid is calcined for 1 to 5 hours, preferably 1.5 to 5 hours, preferably 2 to 5 hours, preferably 2.5 to 5 hours, preferably 3 to 5 hours, preferably 3.5 to 5 hours, preferably 4 to 5 hours, preferably 4.5 to 5 hours, preferably 2 to 4 hours. In a preferred embodiment, the solid is calcined for 3 hours.

EXAMPLES

The following examples demonstrate a multiphase nanocomposite material and a method of preparation thereof. The examples are provided solely for illustration and are not to be construed as limitations of the present disclosure, as many variations thereof are possible without departing from the spirit and scope of the present disclosure.

Example 1: Synthesis of $NiO/MgO/CaCO_3/Ca(OH)_2/C$ and $CaO/NiO/Mg_{0.5}Ni_{0.5}O/Ca(OH)_2/C$ nanocomposites.

Figure 1B:
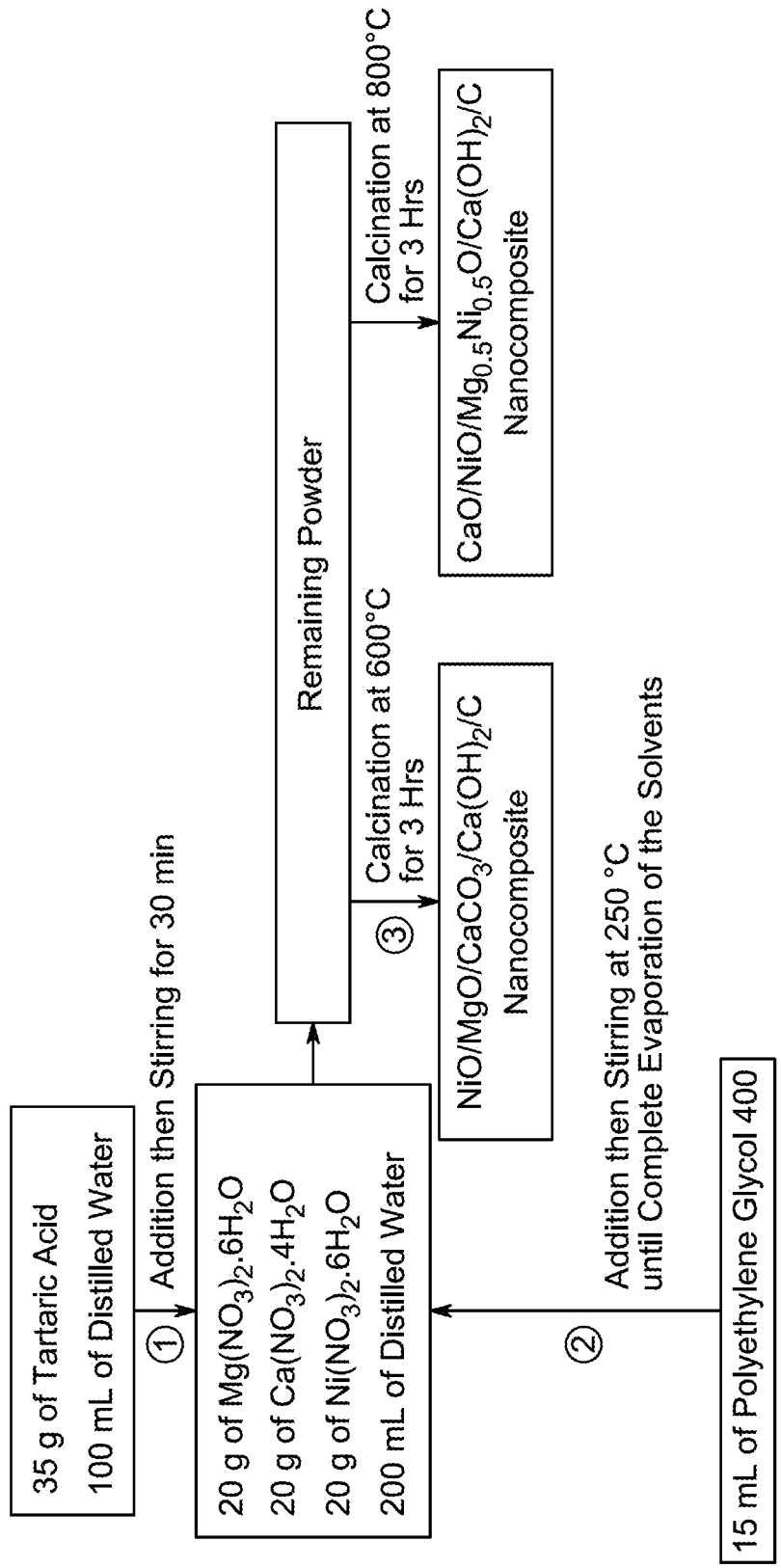
FIG. 1B illustrates an exemplary block diagram of synthesizing the NiO/MgO/CaCO$_3$/Ca(OH)$_2$/C and CaO/NiO/Mg$_{0.5}$Ni$_{0.5}$O/Ca(OH)$_2$/C nanocomposite, according to certain embodiments.

According to the present disclosure, the $NiO/MgO/CaCO_3/Ca(OH)_2/C$ and $CaO/NiO/Mg_{0.5}Ni_{0.5}O/Ca(OH)_2/C$ nanocomposites were synthesized using the Pechini sol-gel method, as described in FIGS. 1A-1B. In particular, for synthesis of the nanocomposites, 35 grams (g) of tartaric acid was dissolved in 100 millilitres (mL) of distilled water. Further, 20 g of magnesium nitrate hexahydrate $(Mg(NO_3)_2 \cdot 6H_2O)$, 20 g of calcium nitrate tetrahydrate $(Ca(NO_3)_2 \cdot 4H_2O)$, and 20 g of nickel nitrate hexahydrate $(Ni(NO_3)_2 \cdot 6H_2O)$ were dissolved in 200 mL of distilled water under vigorous stirring. The tartaric acid $(C_4H_6O_6)$ solution prepared in the first step was then added to the nitrate solution under continuous stirring for 30 minutes.

Subsequently, 15 mL of polyethylene glycol 400 (PEG 400) was added to the mixture, and stirring continued at 250° C. until complete evaporation of the solvents occurred. The resultant powder was collected and subjected to calcination at 600° C. for 3 hours to obtain the NiO/MgO/CaCO$_3$/Ca(OH)$_2$/C nanocomposite. Further, in order to synthesize the CaO/NiO/Mg$_{0.5}$Ni$_{0.5}$O/Ca(OH)$_2$/C nanocomposite, the powder was calcinated at 800° C. for 3 hours.

Figure 2A:
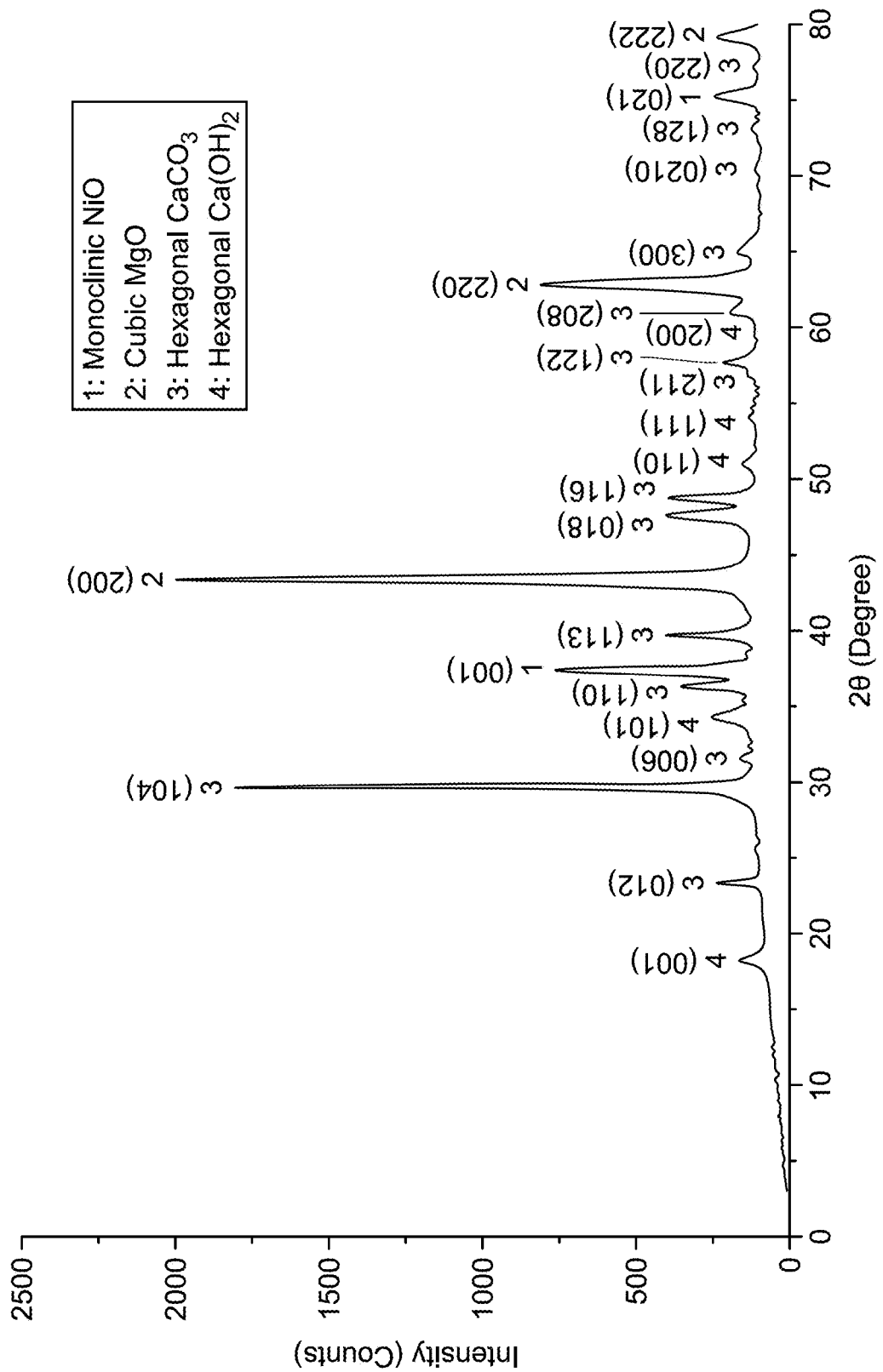
FIG. 2A is a graph depicting X-ray diffraction (XRD) pattern of the nanocomposite synthesized at 600° C., according to certain embodiments.
Figure 2B:
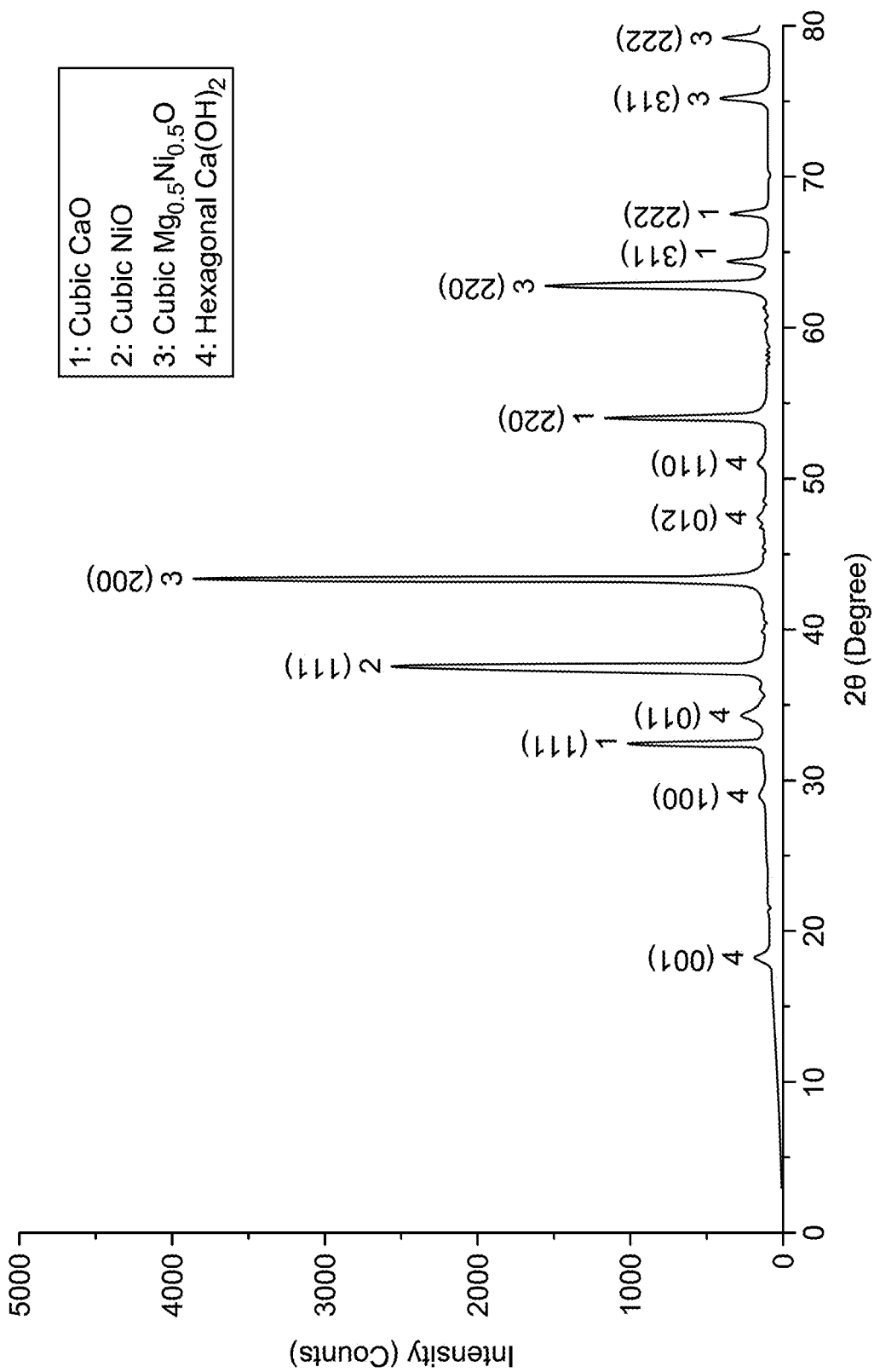
FIG. 2B is a graph depicting XRD pattern of the nanocomposite synthesized at 800° C., according to certain embodiments.

The X-ray diffraction (XRD) patterns confirmed the phase composition and crystallinity of nanocomposites synthesized at 600° C. and 800° C., as shown in FIGS. 2A-2B. At 600° C., the identified phases included nickel oxide (NiO), magnesium oxide (MgO), calcium carbonate (CaCO$_3$), and calcium hydroxide (Ca(OH)$_2$), corresponding to card numbers JCPDS (No. 03-065-6920), JCPDS (No. 01-075-1525), COD (2100992), and JCPDS (No. 00-044-1481), respectively. The above listed phases exhibited monoclinic, cubic, and hexagonal crystal systems. The monoclinic NiO displayed 2θ angles of 37.25° and 75.24°, corresponding to Miller indices (001) and (021), respectively. The cubic MgO exhibited 2θ angles at 43.23°, 62.75°, and 79.22°, assigned to Miller indices (200), (220), and (222), respectively. The hexagonal CaCO$_3$ showed 2θ angles at 23.18°, 29.48°, 31.48°, 36.19°, 39.56°, 47.42°, 48.68°, 56.76°, 57.60°, 60.96°, 64.84°, 70.29°, 72.92°, and 76.81°, with corresponding Miller indices (012), (104), (006), (110), (113), (018), (116), (211), (122), (208), (300), (0 2 10), (128), and (220). The hexagonal Ca(OH)$_2$ exhibited 2θ angles at 18.04°, 34.19°, 50.78°, 54.14°, and 59.39°, assigned to Miller indices (001), (101), (110), (111), and (200), respectively. Furthermore, at 800° C., the identified phases included calcium oxide (CaO), nickel oxide (NiO), magnesium nickel oxide (Mg$_{0.5}$Ni$_{0.5}$O), and calcium hydroxide (Ca(OH)$_2$), corresponding to card numbers JCPDS (No. 01-070-4068), JCPDS (No. 01-086-8824), JCPDS (No. 01-082-9883), and JCPDS (No. 01-078-0315), respectively. The above listed phases exhibited cubic and hexagonal crystal systems. The cubic CaO displayed 2θ angles at 32.21°, 53.94°, 64.22°, and 67.47°, assigned to Miller indices (111), (220), (311), and (222), respectively. The cubic NiO exhibited a 2θ angle of 37.36°, corresponding to Miller index (111). The cubic Mg$_{0.5}$Ni$_{0.5}$O exhibited 2θ angles at 43.12°, 62.75°, 75.13°, and 79.11°, corresponding to Miller indices (200), (220), (311), and (222), respectively. The hexagonal Ca(OH)$_2$ exhibited 2θ angles at 18.04°, 28.86°, 34.09°, 47.23°, and 50.89°, assigned to Miller indices (001), (100), (011), (012), and (110), respectively. The average crystallite size of the nanocomposites synthesized at 600° C. and 800° C. was 60.37 nm and 52.65 nm, respectively, as listed in Table 1 and Table 2. The difference in crystallite size may be attributed to the thermal decomposition behavior of the precursors and the influence of the Pechini sol-gel method using tartaric acid and polyethylene glycol 400, as higher calcination temperatures generally promote phase transformation and particle growth.

TABLE 1

Structural and compositional details of the synthesized nanocomposite at 600° C.

| Components of synthesized nanocomposite at 600 ° C. | | | | Average crystallite size of synthesized nanocomposite (nm) |
|---|---|---|---|---|
| Phase | Chemical name | Card No. | Crystal system | |
| NiO | Nickel oxide | JCPDS-03-065-6920 | Monoclinic | 60.37 |
| MgO | Magnesium oxide | JCPDS-01-075-1525 | Cubic | |
| CaCO$_3$ | Calcite | COD-2100992 | Hexagonal | |
| Ca(OH)$_2$ | Calcium hydroxide | JCPDS-00-044-1481 | Hexagonal | |

TABLE 2

Structural and compositional details of the synthesized nanocomposite at 800° C.

| Components of synthesized nanocomposite at 800° C. | | | | Average crystallite size of synthesized nanocomposite (nm) |
|---|---|---|---|---|
| Phase | Chemical name | Card No. | Crystal system | |
| CaO | Calcium oxide | JCPDS-01-070-4068 | Cubic | 52.65 |
| NiO | Nickel oxide | JCPDS-01-086-8824 | Cubic | |
| Mg$_{0.5}$Ni$_{0.5}$O | Magnesium nickel oxide | JCPDS-01-082-9883 | Cubic | |
| Ca(OH)$_2$ | Calcium hydroxide | JCPDS-01-078-0315 | Hexagonal | |

Figure 3A:
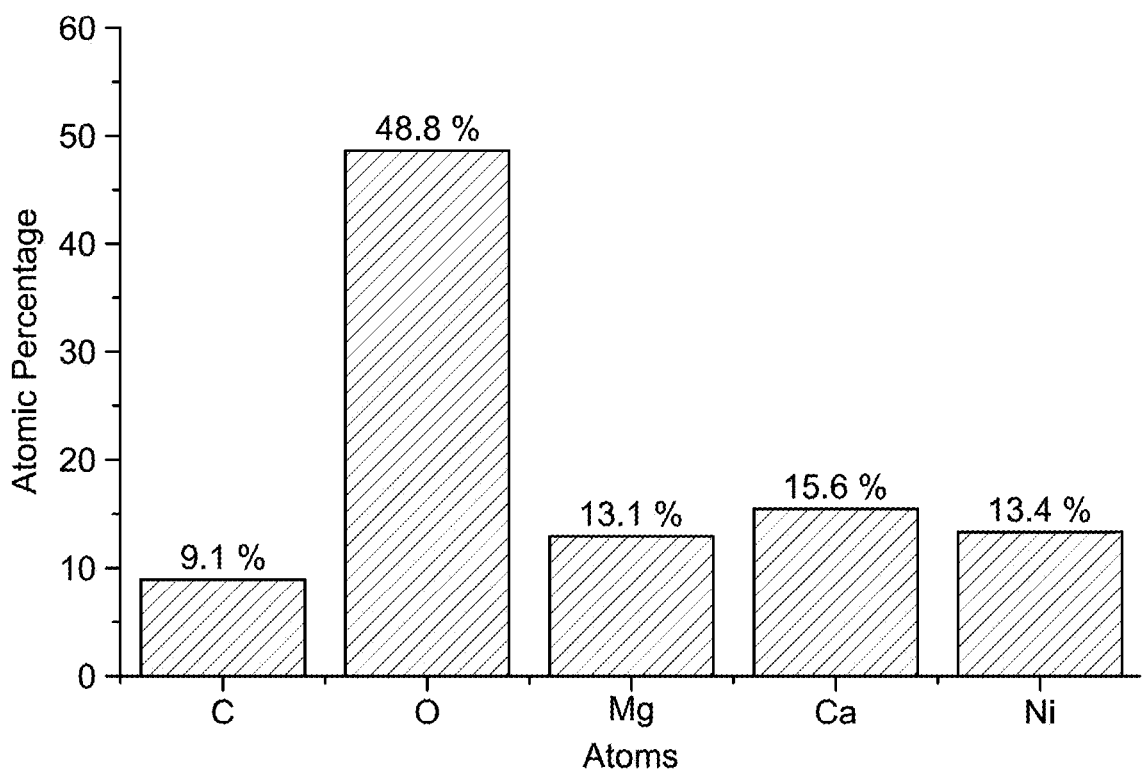
FIG. 3A is a graph depicting atomic percentage distribution of elements in the synthesized nanocomposite, determined by energy dispersive X-ray spectroscopy (EDX), at a temperature of 600° C., according to certain embodiments.
Figure 3B:
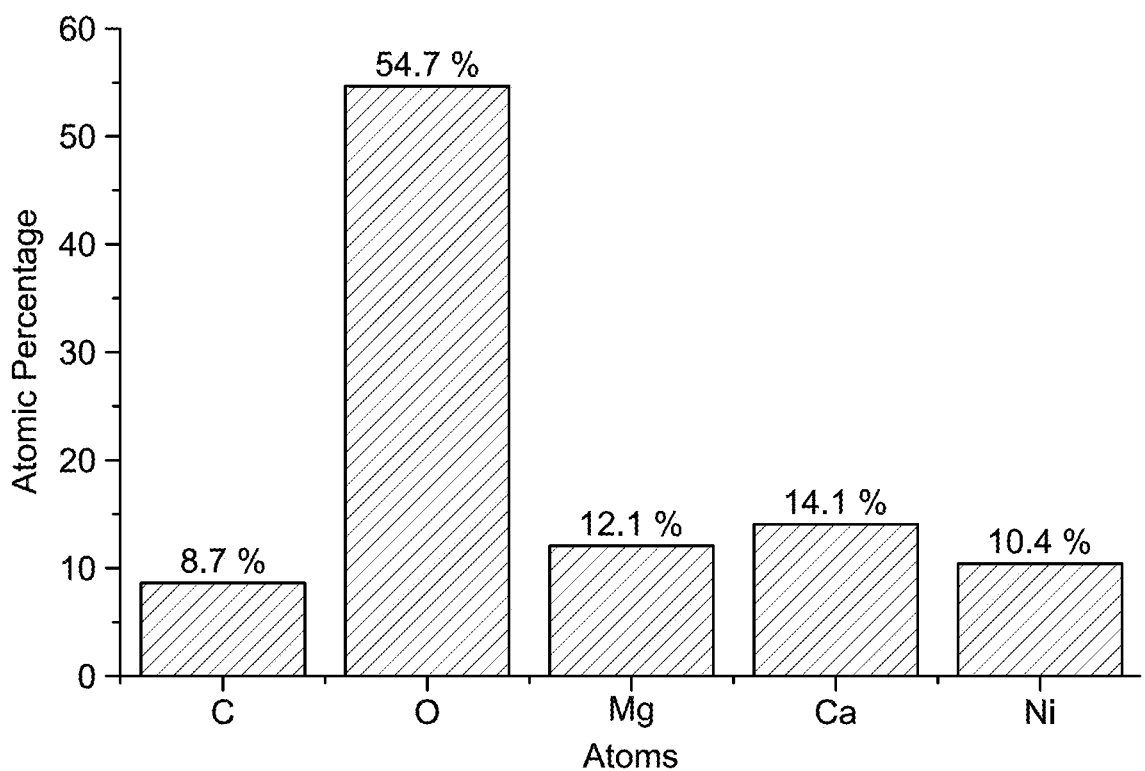
FIG. 3B is a graph depicting atomic percentage distribution of elements in the synthesized nanocomposite, determined by EDX, at a temperature of 800° C., according to certain embodiments.

The atomic percentage distribution of elements in the nanocomposites are shown in FIGS. 3A-3B. The elemental analysis for NiO/MgO/CaCO$_3$/Ca(OH)$_2$/C and CaO/NiO/Mg$_{0.5}$Ni$_{0.5}$O/Ca(OH)$_2$/C nanocomposites synthesized at 600° C. and at 800° C., respectively were determined by energy dispersive X-ray spectroscopy (EDX). For the nanocomposite synthesized at 600° C., the atomic percentages of carbon (C), oxygen (O), magnesium (Mg), calcium (Ca), and nickel (Ni) were 9.1%, 48.8%, 13.1%, 15.6%, and 13.4%, respectively. Further, the nanocomposite synthesized at 800° C. exhibited atomic percentages of 8.7%, 54.7%, 12.1%, 14.1%, and 10.4% for carbon, oxygen, magnesium, calcium, and nickel, respectively. The increase in the oxygen content and the decrease in carbon, magnesium, calcium, and nickel contents for the sample synthesized at 800° C.

may be attributed to thermal decomposition and phase transformations during calcination. At higher temperatures, enhanced oxidation occurs, leading to a higher proportion of oxygen in the final nanocomposite. Concurrently, the volatilization of residual organic components and the stabilization of crystalline phases contribute to the observed reduction in the atomic percentages of other elements. The aforementioned results aligned with the structural changes confirmed by the XRD analysis, indicating the formation of more oxidized and stable phases at elevated temperatures.

Figure 4A:
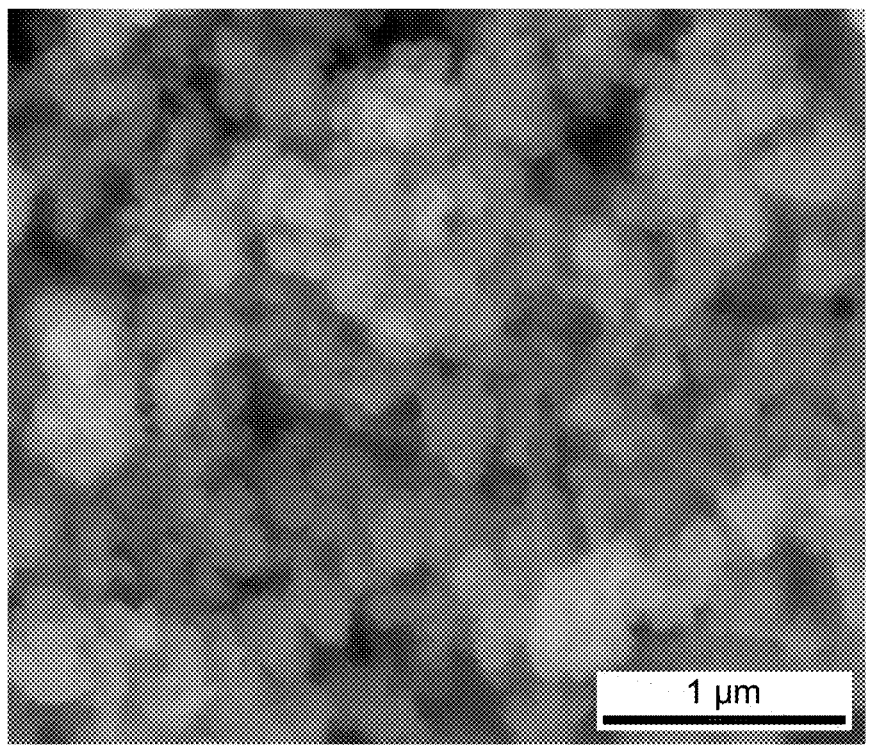
FIG. 4A is a scanning electron microscope (SEM) image of the nanocomposite synthesized at 600° C., at a magnification of 1 micrometer (μm), according to certain embodiments.
Figure 4B:
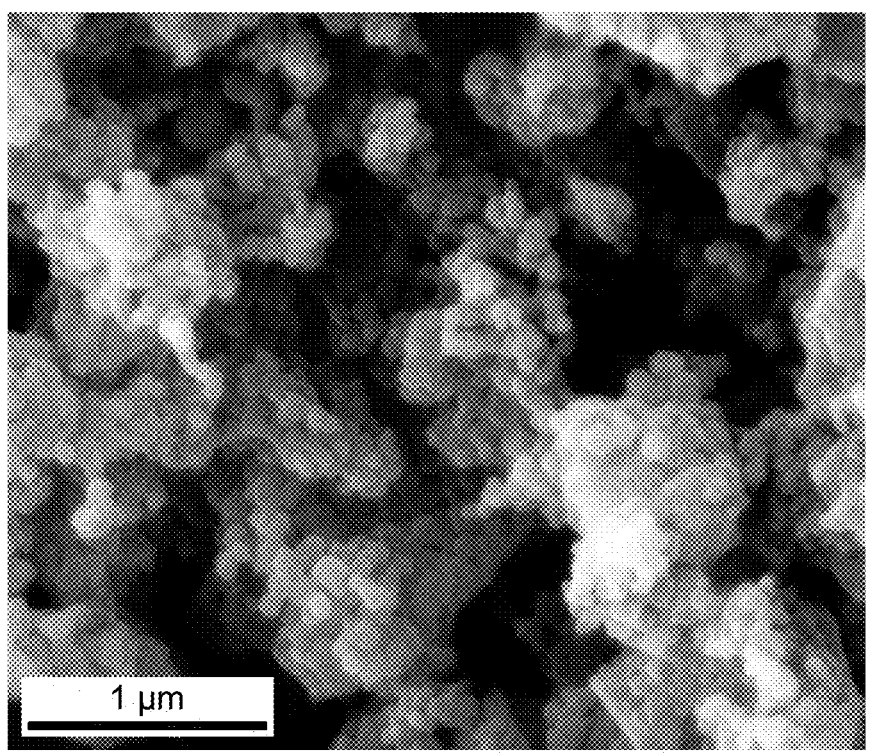
FIG. 4B is a SEM image of the nanocomposite synthesized at 800° C., at a magnification of 1 μm, according to certain embodiments.

The SEM images of the synthesized nanocomposites are shown in FIGS. 4A-4B. In particular, FIG. 4A corresponds to the NiO/MgO/CaCO$_3$/Ca(OH)$_2$/C nanocomposite synthesized at 600° C., while FIG. 4B corresponds to the CaO/NiO/Mg$_{0.5}$Ni$_{0.5}$O/Ca(OH)$_2$/C nanocomposite synthesized at 800° C. The SEM image of the nanocomposite synthesized at 600° C. showed agglomerated spherical particles with relatively uniform distribution. In contrast, the SEM image of the nanocomposite synthesized at 800° C. exhibited irregularly shaped particles, including polygonal and aggregated forms, with enhanced surface roughness. The average grain size of the nanocomposite synthesized at 600° C. was 135.58 nm, while the nanocomposite synthesized at 800° C. had a reduced average grain size of 77.89 nm. This reduction in grain size was attributed to the increased calcination temperature, which promoted further decomposition of residual organic materials and results in more compact and refined crystallite structures. The above listed observations aligned with the structural transformations evident from the XRD and EDX analyses.

Figure 5A:
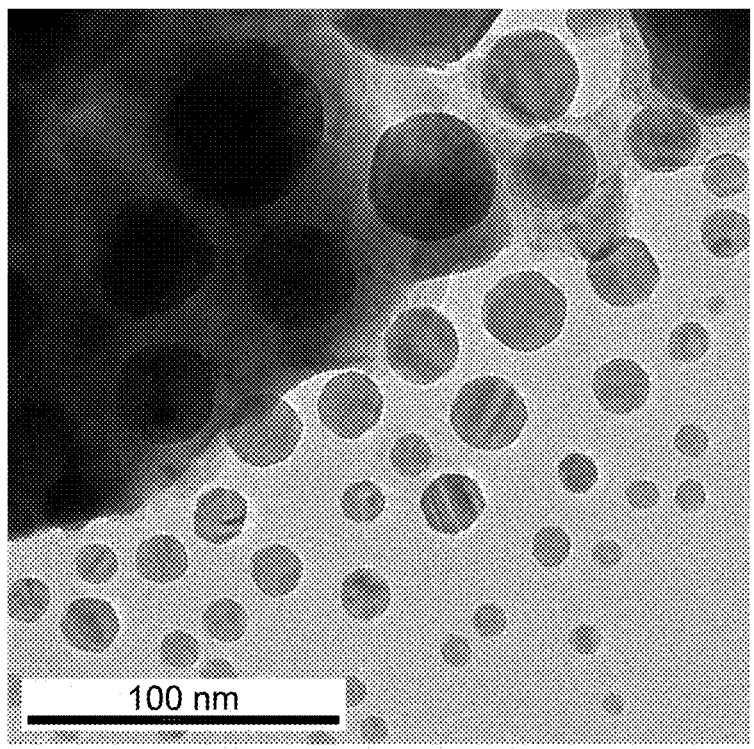
FIG. 5A shows transmission electron microscopy (TEM) image of the nanocomposite synthesized at 600° C., at a magnification of 100 nanometer (nm), according to certain embodiments.
Figure 5B:
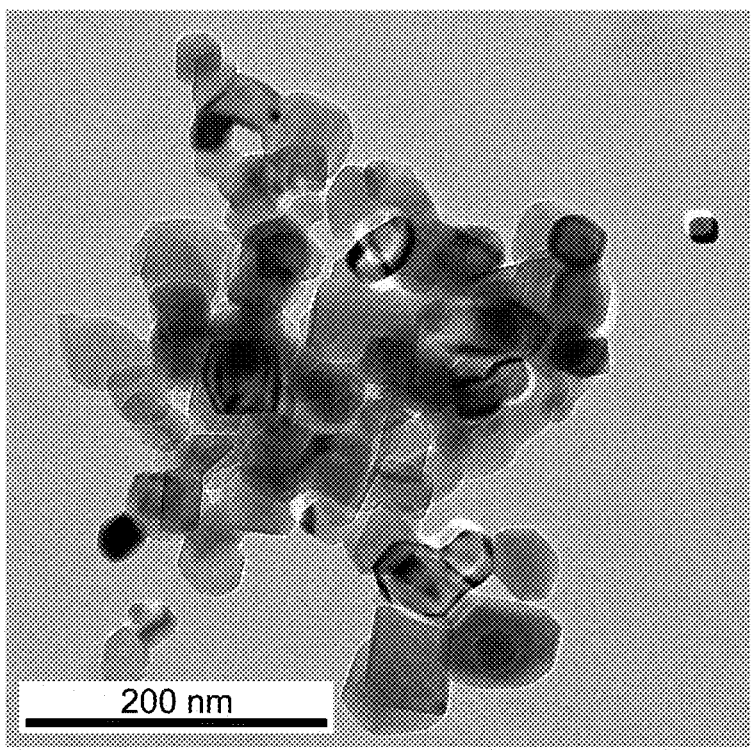
FIG. 5B shows TEM image of the nanocomposite synthesized at 800° C., at a magnification of 200 nm, according to certain embodiments.

In addition, the transmission electron microscopy (TEM) images of the nanocomposites synthesized at 600° C. and 800° C. are shown in FIG. 5A and FIG. 5B, respectively. The TEM image of the nanocomposite synthesized at 600° C., as shown in FIG. 5A, revealed spherical and nearly uniform particles with minimal agglomeration, indicating desirable dispersion and a narrow size distribution. The TEM image of the nanocomposite synthesized at 800° C., as shown in FIG. 5B, exhibited larger and more irregularly shaped particles, including polygonal structures and aggregated clusters, suggesting the effects of thermal treatment on particle growth and morphology. The average particle diameter of the nanocomposite synthesized at 600° C. was 25.89 nm, whereas the nanocomposite synthesized at 800° C. was 35.47 nm. The increase in particle size at the higher calcination temperature was attributed to enhanced crystallite growth and particle agglomeration driven by thermal energy, which facilitated the fusion of smaller particles into larger ones. The morphological differences aligned with the structural transformations and crystallite size variations as observed in XRD and SEM analyses.

Aspects of the present disclosure include the NiO/MgO/CaCO$_3$/Ca(OH)$_2$/C and CaO/NiO/Mg$_{0.5}$Ni$_{0.5}$O/Ca(OH)$_2$/C nanocomposites, fabricated using the Pechini sol-gel method. The prepared nanocomposites exhibited potential for commercial applications across various fields. The nanocomposites may be utilized in environmental remediation for adsorbing heavy metal ions and toxic pollutants from aqueous media, focusing water pollution concerns. Additionally, the synthesized nanocomposites may be employed in catalysis for industrial chemical processes and in advanced materials for energy storage or conversion, such as in batteries or fuel cells, due to their distinctive structural and compositional properties.

The distinctiveness of the synthesized nanocomposites appear from the multi-phase composition of the nanocomposites and desirable structural properties. Further, XRD analysis confirmed the formation of distinct phases, including NiO, MgO, CaCO$_3$, Ca(OH)$_2$, CaO, and Mg$_{0.5}$Ni$_{0.5}$O, with average crystallite sizes of 60.37 nm for the nanocomposite synthesized at 600° C. and 52.65 nm for the one synthesized at 800° C., demonstrating the impact of calcination temperature on crystallinity. SEM revealed differences in particle morphology, with spherical and relatively uniform grains averaging 135.58 nm for the nanocomposite fabricated at 600° C. and irregular polygonal grains with an average size of 77.89 nm for the nanocomposite fabricated at 800° C., indicating enhanced compaction and refinement at higher temperatures. EDX analysis provided atomic distribution insights, which depicted changes in elemental percentages attributed to thermal decomposition and oxidation processes during calcination. TEM further highlighted the particle morphology, showing spherical particles for the 600° C. nanocomposite with an average diameter of 25.89 nm and irregularly shaped, larger particles for the 800° C. nanocomposite with an average diameter of 35.47 nm, reflecting particle growth and agglomeration under elevated temperatures. The Pechini sol-gel method may provide scalability and cost-effectiveness while delivering advanced material properties, positioning the synthesized nanocomposites as a contribution to the field of multifunctional nanomaterials.

Obviously, numerous modifications and variations of the present disclosure are possible in light of the above teachings. It is, therefore, to be understood that within the scope of the appended claims, the disclosure may be practiced otherwise than as specifically described herein.

The invention claimed is:

1. A NiO/MgO/CaCO$_3$/Ca(OH)$_2$/C nanocomposite material, comprising:
 a monoclinic NiO phase;
 a cubic MgO phase;
 a hexagonal CaCO$_3$ phase; and
 a hexagonal Ca(OH)$_2$ phase,
 wherein the NiO/MgO/CaCO$_3$/Ca(OH)$_2$/C nanocomposite material has a granular morphology comprising spherical particles having an average particle diameter in a range from 10 to 50 nm; and
 wherein the NiO/MgO/CaCO$_3$/Ca(OH)$_2$/C nanocomposite material has an oxygen content in a range from 40 to 60 atomic % (at. %), a calcium content in a range from 5 to 25 at. %, a nickel content in a range from 8 to 18 at. %, a magnesium content in a range from 8 to 18 at. %, and a carbon content in a range from 5 to 20 at. % wherein at. % is based on the total number of atoms in the NiO/MgO/CaCO$_3$/Ca(OH)$_2$/C nanocomposite material.

2. The NiO/MgO/CaCO$_3$/Ca(OH)$_2$/C nanocomposite material of claim 1, wherein the spherical particles have an average particle diameter in a range from 20 to 30 nm.

3. The NiO/MgO/CaCO$_3$/Ca(OH)$_2$/C nanocomposite material of claim 1, wherein the NiO/MgO/CaCO$_3$/Ca(OH)$_2$/C nanocomposite material has an average crystallite size in a range from 40 to 80 nm.

4. A NiO/MgO/CaCO$_3$/Ca(OH)$_2$/C nanocomposite material, comprising:
 a monoclinic NiO phase;
 a cubic MgO phase;
 a hexagonal CaCO$_3$ phase; and
 a hexagonal Ca(OH)$_2$ phase,
 wherein the NiO/MgO/CaCO$_3$/Ca(OH)$_2$/C nanocomposite material has a granular morphology comprising spherical particles having an average particle diameter in a range from 10 to 50 nm;

wherein the NiO/MgO/CaCO$_3$/Ca(OH)$_2$/C nanocomposite material has an oxygen content in a range from 45 to 55 atomic % (at. %), a calcium content in a range from 10 to 20 at. %, a nickel content in a range from 10 to 16 at. %, a magnesium content in a range from 10 to 15 at. %, and a carbon content in a range from 6 to 15 at. % wherein at. % is based on the total number of atoms in the NiO/MgO/CaCO$_3$/Ca(OH)$_2$/C nanocomposite material.

\* \* \* \* \*